(12) United States Patent
Märkl et al.

(10) Patent No.: US 9,714,698 B2
(45) Date of Patent: Jul. 25, 2017

(54) DUAL CLUTCH TRANSMISSION (71) Applicant: AUDI AG, Ingolstadt (DE)

(72) Inventors: Johann Märkl, Neuburg an der Donau (DE); Axel Heitmann, Ditzingen (DE); Steffen Hummel, Ingolstadt (DE); Frank Vollmer, Ingolstadt (DE); Alexander Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 224 days.

(21) Appl. No.: 14/439,492

(22) PCT Filed: Oct. 23, 2013

(86) PCT No.: PCT/EP2013/003187
§ 371 (c)(1),
(2) Date: Apr. 29, 2015

(87) PCT Pub. No.: WO2014/067635
PCT Pub. Date: May 8, 2014

(65) Prior Publication Data
US 2015/0285353 A1     Oct. 8, 2015

(30) Foreign Application Priority Data

Oct. 30, 2012  (DE) .................. 10 2012 021 598

(51) Int. Cl.
*F16H 37/04*  (2006.01)
*F16H 3/00*  (2006.01)
*B60K 17/346*  (2006.01)

(52) U.S. Cl.
CPC .......... *F16H 37/046* (2013.01); *F16H 3/006* (2013.01); *B60K 17/346* (2013.01);
(Continued)

(58) Field of Classification Search
CPC .......... F16H 37/046; F16H 2200/2007; F16H 2200/2033; F16H 2001/2881
See application file for complete search history.

(56) References Cited

U.S. PATENT DOCUMENTS 2,853,890 A * 9/1958 Kelbel ............... B60K 17/3505
180/23
4,074,581 A * 2/1978 Stevens ................... F16H 3/085
475/207

(Continued)

FOREIGN PATENT DOCUMENTS

CN     102673393     9/2012
CN     102777592     11/2012
(Continued)

OTHER PUBLICATIONS

Chinese Search Report issued by the Chinese Patent Office in Chinese Application No. 2013800567453 on Aug. 26, 2016.
(Continued)

*Primary Examiner* — Stacey Fluhart
(74) *Attorney, Agent, or Firm* — Henry M. Feiereisen LLC (57) ABSTRACT

A shifting device for a dual clutch transmission as a speed-change transmission for motor vehicles, including two coaxially arranged input shafts, each being activatable via a clutch, an axially parallel output shaft and gearwheel sets that are mounted on the shafts and can be shifted by means of shifting clutches to allow a plurality of forward gears and a reverse gear, the gearwheel sets being subdivided into a sub-transmission having the one input shaft and a sub-transmission having the other input shaft. To achieve a wider gear-ratio spread in a structurally compact construction, a planetary gear train that can be shifted between two gear (Continued)

ratio stages is mounted upstream of the sub-transmission having the hollow input shaft.

20 Claims, 6 Drawing Sheets

(52) U.S. Cl.
CPC .......... *F16H 2200/006* (2013.01); *F16H 2200/0017* (2013.01); *F16H 2200/0065* (2013.01); *F16H 2200/0073* (2013.01); *F16H 2200/0086* (2013.01); *F16H 2200/2007* (2013.01); *F16H 2200/2033* (2013.01)

(56) References Cited

U.S. PATENT DOCUMENTS

| | | | |
|---|---|---|---|
| 8,627,736 | B2 | 1/2014 | Märkl |
| 8,746,096 | B2 | 6/2014 | Märkl |
| 2005/0205378 | A1 | 9/2005 | Miyazaki et al. |
| 2009/0095101 | A1 | 4/2009 | Gitt |
| 2009/0156349 | A1 | 6/2009 | Yang |
| 2009/0203484 | A1* | 8/2009 | Earhart .......... F16H 3/006 475/207 |
| 2010/0004088 | A1 | 1/2010 | Wenthen |
| 2011/0230298 | A1* | 9/2011 | Salamandra .......... F16H 37/046 475/207 |
| 2011/0259147 | A1 | 10/2011 | Hoffmann |
| 2012/0252626 | A1* | 10/2012 | Robinette .......... F16H 3/006 475/284 |
| 2013/0123057 | A1 | 5/2013 | Märkl |
| 2013/0123058 | A1 | 5/2013 | Märkl |

FOREIGN PATENT DOCUMENTS

| | | | |
|---|---|---|---|
| CN | 102892606 | 1/2013 | |
| CN | 104755807 | 7/2015 | |
| DE | 35 46 454 | 2/1987 | |
| DE | 102 30 185 | 1/2004 | |
| DE | 603 02 573 | 7/2006 | |
| DE | 10 2006 015 661 | 10/2007 | |
| DE | 10 2006 024 053 | 11/2007 | |
| DE | 10 2008 030 376 | 6/2009 | |
| DE | 10 2008 001 200 | 10/2009 | |
| DE | 10 2008 054 477 | 6/2010 | |
| DE | 102010046766 | 3/2012 | |
| EP | 0 797 025 | 9/1997 | |
| EP | 2 141 385 | 1/2010 | |
| FI | EP 2267334 A1 * | 12/2010 | .......... F16H 37/046 |
| JP | 2002-364718 | 12/2002 | |

OTHER PUBLICATIONS

English translation of Chinese Search Report issued by the Chinese Patent Office in Chinese Application No. 2013800567453 on Aug. 26, 2016.

International Search Report issued by the European Patent Office in International Application PCT/EP2013/003187.

* cited by examiner

Fig. 9

DUAL CLUTCH TRANSMISSION

CROSS-REFERENCES TO RELATED APPLICATIONS

This application is the U.S. National Stage of International Application No. PCT/EP2013/003187, filed Oct. 23, 2013, which designated the United States and has been published as International Publication No. WO 2014/067635 and which claims the priority of German Patent Application, Serial No. 10 2012 021 598.3, filed Oct. 30, 2012, pursuant to 35 U.S.C. 119(a)-(d).

BACKGROUND OF THE INVENTION

The present invention relates to a shifting device for a dual clutch transmission as change-speed transmission for motor vehicles.

Such dual clutch transmissions can be used as automated switching transmissions with good transmission efficiency, and due to the division into two subtransmissions and two separating clutches can be switched fast and without interruption of traction. In order to optimally adjust such change speed transmissions to the drive power of the drive aggregate or internal combustion engines, a wide transmission ratio spread is desired, which can be realized for example by providing a higher number of forward gears (in the absence of excessive transmission steps).

SUMMARY OF THE INVENTION

It is an object of the present invention to set forth a dual clutch transmission of the generic type, which enables wide transmission ratio spread and in an increased number of in particular forward gears, while at the same time being of compact construction and well manageable in terms of control.

The object is solved with the features of patent claim 1. Advantageous embodiments and refinements of the invention are set forth in the dependent claims.

According to the invention it is proposed that a planetary transmission, which can be shifted between two transmission stages, is arranged upstream of the subtransmission A with the input hollow shaft. The planetary transmission results in a doubling of the number of gears in the subtransmission A, whereby in the subtransmission B in spite of the realizable wider transmission ratio spread the number of the gearwheel sets can be reduced compared to a conventional gearwheel set so that the overall length of the transmission is not increased and the additional costs can be kept low. The forward gears realized in the subtransmission A can be driven in two different transmission ratios per gearwheel set, wherein the shifting can also be accomplished relatively easily and automated. The gears in the subtransmission B are assigned so that the shifting of the gears without interruption of traction is retained.

As is known, the planetary transmission can have an input element, an output element and a transmission element, which can be fixed via a brake for shifting the lower (i.e., shorter) transmission stage, which leads to a higher output torque. Shifting into the 1:1 transmission stage can be accomplished via the clutch K1, wherein the clutch K1 couples two elements of the planetary transmission (for example the input element and the transmission element) with each other, so that no transmission losses occur.

A separate clutch enables switching into a higher transmission ratio 1:1, wherein the clutch connects two elements of the planetary transmission with each other so that no transmission losses occur in the 1:1 transmission ratio. The brake and the clutch are preferably hydraulically actuatable friction based elements, for example of a multi-disc construction.

The brake and the clutch K1 of the dual transmission are preferably hydraulically actuatable, friction-acting elements for example in the manner of a multi-disc construction. The dual transmission can be drivingly connected with a driving rive aggregate or an internal combustion engine. For this the dual clutch, which is constructed as multi-disc clutch, has a clutch housing, on which a force outputting shaft of the internal combustion engine is fixed in rotative fixed relationship. When the internal combustion engine is activated the clutch housing is therefore constantly rotating. The force flux is therefore transmitted via the clutch housing either to the first input shaft or to the second input shaft.

The planetary transmission can have a first sun gear as input element, a second sun gear as output element and a web as transmission element, on which multi-stage planet gears are supported, which are in engagement with the two sun gears. Hereby the input element (for example the driving sun gear) is constantly drivingly connected with the housing of the dual clutch transmission, while the transmission element or the web can be activated via the clutch K1 of the dual clutch transmission. This has the advantage that a starting of the motor vehicle for example in the first forward gear or in the reverse gear and in the lower transmission stage of the planetary gear transmission can be controlled via the brake, which is connected to the web, wherein optionally the corresponding clutch K1 can be configured with a lower clutch torque. This for example makes it possible to omit the separate clutch (i.e. K3 in FIG. 8) for shifting the planetary transmission.

In a further advantageous embodiment of the invention the planetary transmission can be constructed as minus transmission (standard transmission ratio for example $i_o = -3$), which allows further improving the proportion of clutch power or the transmission efficiency in the speed-reduction stage.

In a further preferred embodiment of the invention, the change-speed transmission can have eight forward gears, of which the first and the second forward gear, the fourth and the fifth forward gear and the seventh and eighth forward gear are assigned to the subtransmission A with the upstream arranged planetary transmission, and the third and sixth gear are assigned to the subtransmission B. The eight forward gears can thus be realized by five gearwheel sets, wherein the number of forward gears of the three gearwheel sets of the subtransmission A is doubled via the shiftable planetary transmission.

In addition, in the case of a change-speed transmission with more than eight forward gears the ninth forward gear can be assigned to the subtransmission B via a further gearwheel set and optionally the forward gears 10 and 11 can be assigned to the subtransmsision A also via a further gearwheel set.

Finally, a gearwheel set with an intermediate gear wheel can be assigned to the subtransmission A with the upstream arranged planetary gear transmission for providing two reverse gears; as an alternative the gearwheel set with intermediate gear wheel can be arranged in the subtransmission B for forming only one reverse gear. The latter has the advantage that the starting gears (forward-reverse) are not controlled via the same starting element and with this an uneven clutch wear can be avoided.

BRIEF DESCRIPTION OF THE DRAWING

In the following, multiple exemplary embodiments of the invention are explained in more detail by way of the included schematic drawings. It is shown in.

DETAILED DESCRIPTION OF PREFERRED EMBODIMENTS

Figure 1:
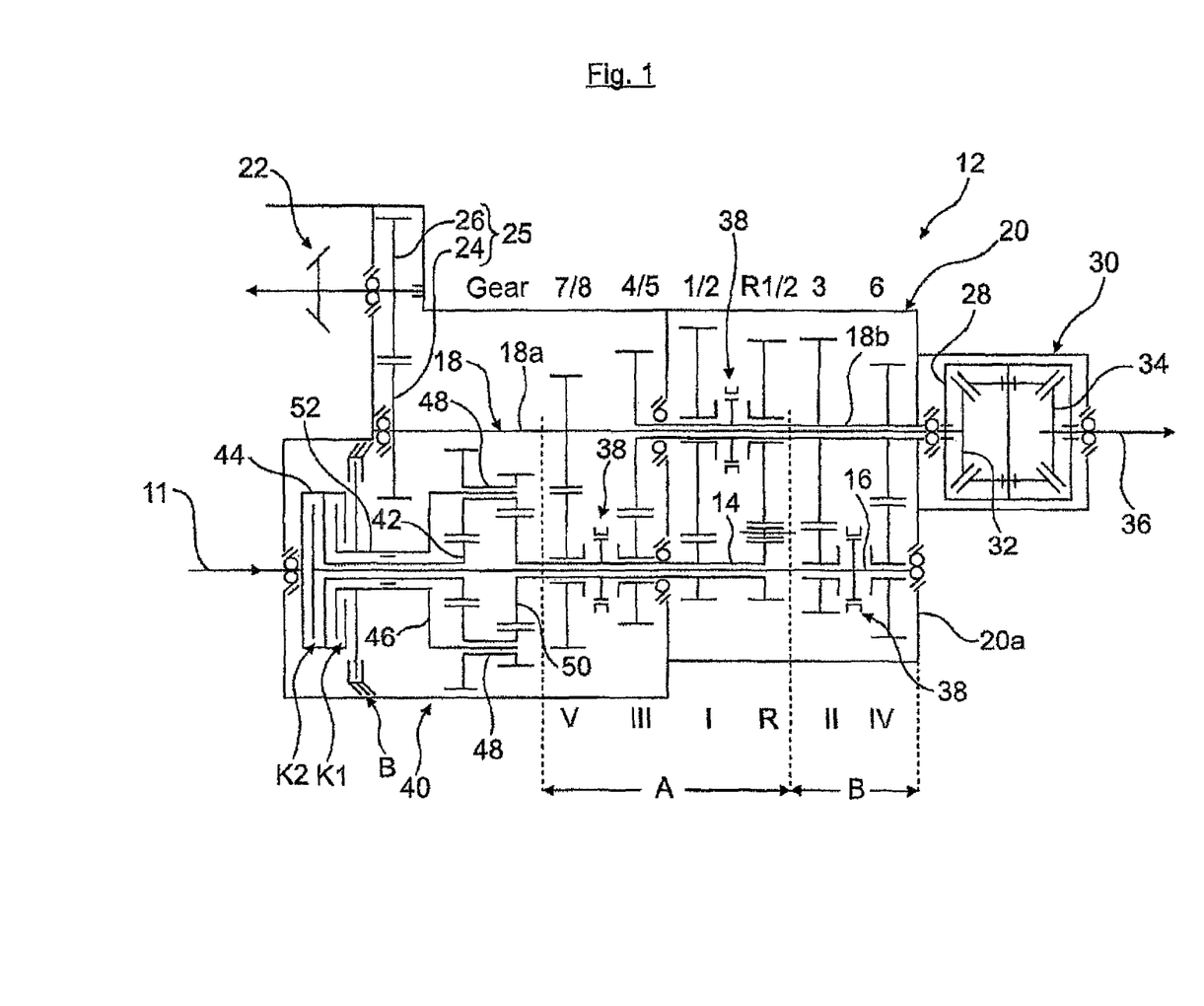
FIG. 1 a block diagram of a twin clutch transmission for an all-wheel drive motor vehicle, with two subtransmissions A and B, wherein a planetary transmission is arranged upstream of the subtransmission A.

FIG. 1 shows very, schematically a dual clutch transmission 12 as change-speed transmission for motor vehicles, with two coaxial transmission input shafts 14, 16, which are drivingly connectable with, a driving drive aggregate or an internal combustion engine via two separating clutches K1, K2. For this the dual clutch transmission, which is for example configured as multi-disc clutch, has a clutch housing 44, on which an output shaft 11 of the internal combustion engine is fixed for co-rotation with the housing. When the internal combustion engine is active, the clutch housing 44 therefore permanently rotates. The force flux is therefore conducted via the clutch housing 44 either to the first input shaft 14 or to the second input shaft 16. The input shaft 14 is constructed as a hollow shaft.

An output shaft 18 is provided axially parallel to the input shafts 14, 16, and in the exemplary embodiment is formed by a first output shaft 18a and a second coaxial output shaft 18b, which is configured as a hollow shaft.

Via an output stage 25 consisting of spur gears 24, 26, the first output shaft 18a outputs to a front axle differential 22 (only indicated schematically) attached to the transmission housing 20, while the second output shaft 18b outputs to an interaxle differential 30, whose output elements or bevel gears 32, 34 are connected on one side with the output shaft 36 for driving the front axle differential 22 and on the other end with an output shaft 36 for driving a rear axle differential (not shown) of the motor vehicle.

The shown layout of the output shaft 18 with the interaxle differential 30 makes it possible for individual forward gears to output directly to the front axle differential, while other forward gears and the reverse gear form an all-wheel drive via the interaxle differential 30.

When outputting only to an axle differential 22 (front wheel drive) or via the output shaft 36 to a rear axle differential (rear wheel drive), the output shaft 18 can also be configured one-piece and without interaxle differential 30.

The mentioned shafts 14, 16, 18 etc. are rotatably supported via only schematically indicated rolling bearings in the transmission housing 20.

The twin clutch transmission 12 is divided into a subtransmission A and a subtransmission B, wherein the input hollow shaft 14 only extends within the subtransmission A, while the input shaft 16 is guided through the input shaft 14 into the subtransmission B up to its end wall 20a.

In the subtransmission A three forward-gears gearwheel sets I, II, V and a reverse-gear gearwheel set R with an integrated reverse gearwheel are arranged, which are composed in a known manner of fixed gearwheels and idler gears, wherein the idler gears can be switched via synchronizing clutches (generally designated 38). The gearwheel sets I, II, V, R form the forward gears 1/2, 4/5, 7/8 and two reverse gears R 1/2 (as will be explained below).

In the subtransmission B two forward-gear gearwheel sets II and IV are provided, which are also formed by fixed gearwheels and idler gears, which can be switched via a synchronizing clutch 38, and which in the corresponding transmission configuration form the forward gears 3 and 6.

A planetary transmission 40 is arranged upstream of the subtransmission A adjacent the dual clutch K1, K2, which planetary transmission 40 is configured coaxial to the output hollow shaft 14 and which can be shifted between two transmission stages or between a lower/higher transmission stage and a 1:1 transmission stage.

The input element of the planetary transmission 40 is formed by a first sun gear 42, which is connected to the housing 44 of the dual clutch K1, K2 and is thus constantly driven.

The web 46 as transmission element of the planetary transmission 40 carries multiple rotatably supported multi-stage planet gears 48, of which the one, greater gearwheel meshes with the sun gear 42 and can be drivingly connected with the clutch K1.

The smaller gearwheel of the multi-stage planet gears 48 is connected with a second sun gear 50 as output element of the planetary transmission 40 with the input hollow shaft 14 of the subtransmission A.

Further the hollow shaft 52 carrying the web 46 is connected to a brake B which is constructed similar to a multi-disc clutch, and via which the web 46 can be fixed by braking through open or closed-loop control.

In the following description, as an example, a lower transmission stage is shifted at disengaged clutch K1 and at actuated brake B, while at engaged clutch K1 and at non-actuated brake B the transmission stage is shifted which is higher than the lower transmission stage, so that the invention can be described as follows:

When the clutch K1 is disengaged and the brake B is actuated, the sun gear 42 drives the sun gear 50 via the multi-stage planet gears 48, and the sun gear 50 drives the input shaft 14 in the lower transmission stage; at correspondingly shifted gearwheel sets of the subtransmission A this corresponds to the forward gears 1 (here the starting of the motor vehicle is controlled by the brake B via the exerted braking torque), 4 and 7, and when the gearwheel set R is shifted to the reverse gear R1. When the brake B is disengaged the drive power is interrupted.

For shifting the planetary transmission 40 to the 1:1 transmission stage, the clutch K1 is engaged, wherein the sun gear 42 and the web 46 are now coupled together and the planetary transmission 40 is blocked in itself. The drive torque is correspondingly divided via the clutch K1 and the housing 44. In the 1:1 transmission stage of the planetary transmission 40 the forward gears 2, 5, 8 and the reverse gear R2 can be shifted.

For shifting the forward gears 3 and 6 of the subtransmission B the gearwheel sets II or IV are shifted in a known manner via the synchronizing clutch 38 and are activated via the separating clutch K2. Hereby the clutch K1 and the brake B of the planetary transmission 40 are disengaged.

Figure 3:
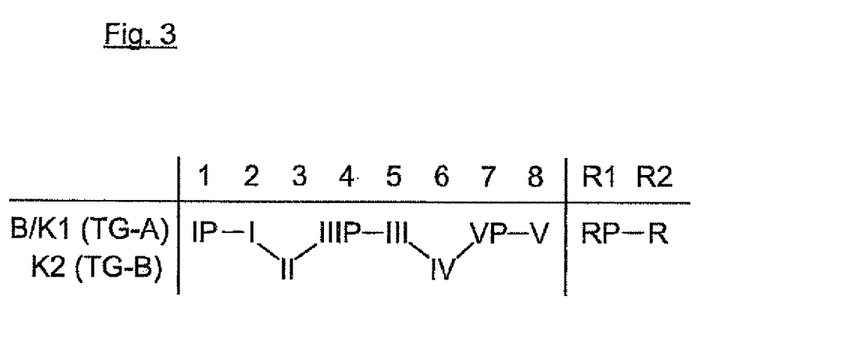
FIG. 3 a shifting matrix illustrating the shifting sequences for a dual clutch transmission having eight forward gears.

The shifting matrix according to FIG. 3 shows the shifting sequence for example when passing through the forward gears 1 to 8 and the two possible reverse gears R1 and R2.

When the motor vehicle is to be started in the $1^{st}$ gear, the drive torque is introduced via the brake B after coupling the gearwheel set I by means of the synchronizing clutch 38, wherein the planetary transmission 40 as described above is in the lower transmission stage (this is respectively indicated for example with IP; P stands for planetary transmission active).

Subsequently the $2^{nd}$ gear is shifted by disengaging the brake B and engaging the clutch K1. This can be controlled without any interruption of traction. In the shifting processes described so far the $3^{rd}$ gear can already be engaged beforehand in the subtransmission B via the synchronizing clutch 38.

When shifting into the $3^{rd}$ gear the clutch K1 is disengaged and without interruption of traction the clutch K2 is simultaneously engaged.

When driving tin the $3^{rd}$ gear the gearwheel set III for the $4^{th}$ and $5^{th}$ gear can be shifted subtransmission A via the synchronizing clutch 38. The gears 4 and 5 are then activated in analogy to the gears 1 and 2 as described above via the brake B (IIIP) and subsequently via the clutch K1 (III).

The same applies to the $6^{th}$ gear in the subtransmission B and the further gears 7 and 8 via the subtransmission A.

For shifting the reverse gears via the reverse-gear gearwheel set R, the gearwheel set R is shifted via the synchronizing clutch 38 and then either the brake B is actuated (R1 or RP) or at disengaged brake B the clutch K1 is engaged (R2 or R).

The dual clutch transmission can have further gears, for example forward gears 9 to 11. For this an additional gearwheel set VII would have to be provided according in the subtransmission A according to FIG. 1, which preferably can be arranged instead of the shown reverse gear gearwheel set RW and which can form the gears 10 and 11 in the corresponding transmission ratio configuration.

Further an additional gearwheel set VI for a $9^{th}$ gear and the reverse gear gearwheel set RW can be arranged in eh subtransmission B, which can be shifted via a common synchronizing clutch 38.

Figure 2:
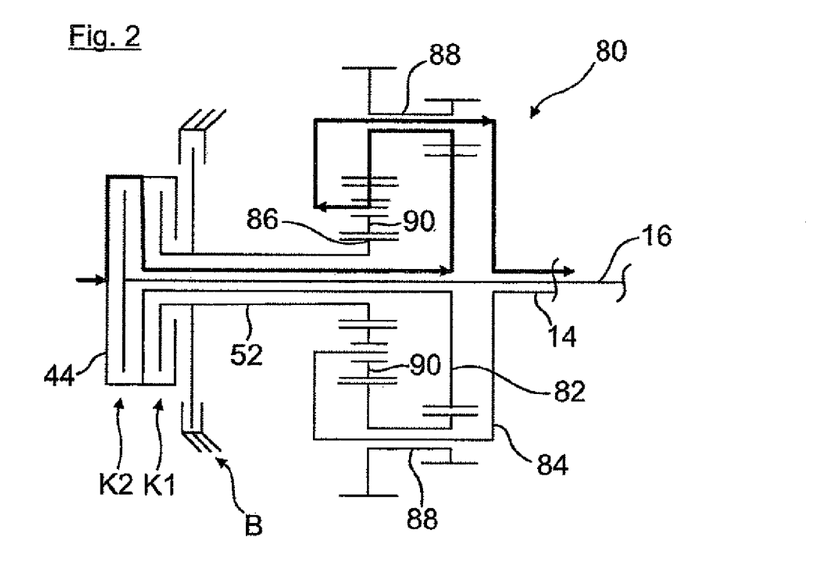
FIG. 2 a further planetary transmission alternative to the one of FIG. 1, configured as minus transmission.

FIG. 2 shows a further alternative configuration of the upstream arranged planetary gear; functionally same parts are again provided with the same reference signs.

The planetary transmission according to FIG. 2 is configured as minus transmission 80, i.e., it has a negative standard transmission ratio (in the exemplary embodiment of $i_0=-3$). This means the ratio between the angular velocities or the rotational speeds of the center gear shafts in a planetary transmission when the web stands still or is imagined to stand still.

The minus transmission 80 has as input element a first sun gear 82 which is connected to the housing 44 of the dual clutches, K2 and is therefore constantly driven.

Further a web 84 is provided as output element which is drivingly connected with the hollow shaft 14 of the subtransmission A.

A second sun gear 86 forms the transmission element of the minus transmission 80 which is connected to the clutch K1 via the hollow shaft 52. The clutch. K2 is connected to the input shaft 16 of the subtransmission B as described above.

The web 84 carries first multi-stage planet gears 88 which are rotatably supported, and of which the smaller gearwheel meshes with the sun gear 82, while the greater gearwheel is in engagement with radially inwardly situated second planetary gears 90 and these with the second sun gear 86.

The housing-fixed brake B is in turn connected to the hollow shaft 52 of the second sun gear 86.

The shifting function of the minus transmission 80 is, aside from the different torque flux (indicated by arrows), equal to the planetary transmission 40. In the lower transmission stage the brake B is actuated or the sun gear 86 is fixed. The sun gear 82 drives the web 84 via the multi-stage planet gears 88 and the planet gears 90, and the web drives the input hollow shaft 14 of the subtransmission B.

When the brake B and the clutch K1 are disengaged, there is no transmission of drive power.

For shifting the minus transmission 80 to the 1:1 transmission ratio the clutch K1 is engaged, whereby the two sun gears 82, 86 are coupled with each other via the web 84 or the minus transmission 80 is blocked.

The shifting sequence of the forward gears 1 to 8 or optionally up to 11 and the revere gears R corresponds to the one of FIG. 1 or to the shifting matrix according to FIG. 3.

Figure 5:
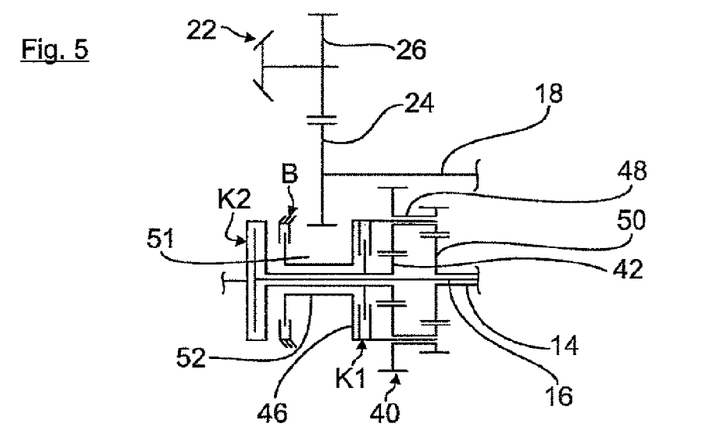
Figure 6:
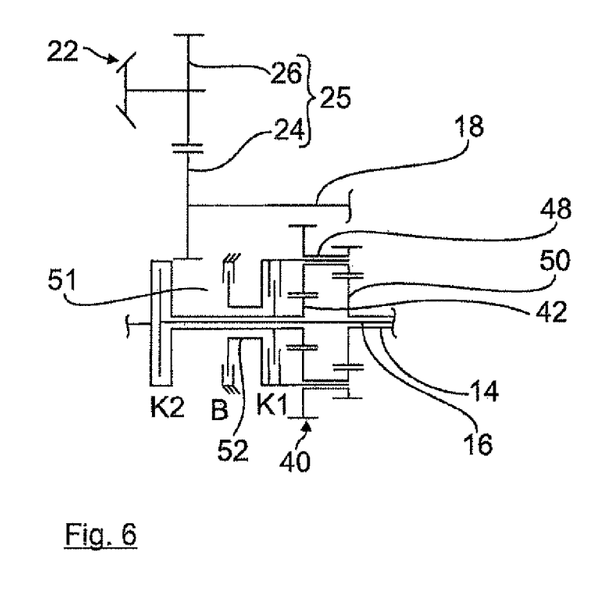
Figure 7:
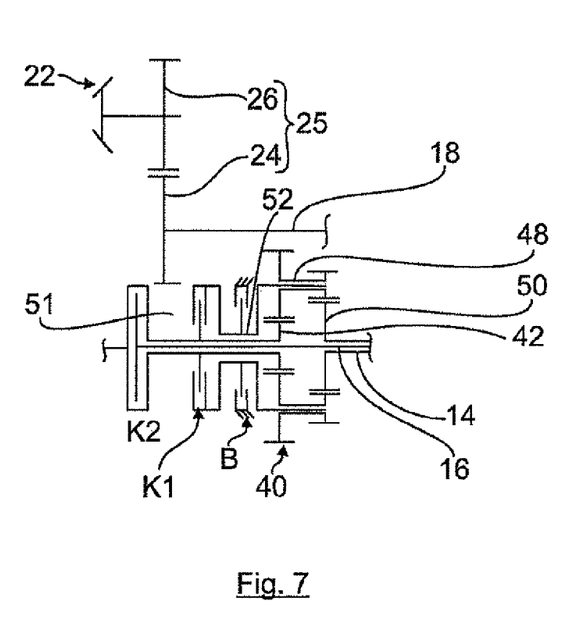

The following exemplary embodiments of FIGS. 4 to 7 also respectively relate to a dual clutch transmission, of which however only the dual clutch and the planetary transmission 40 is shown. The function and the construction of the dual clutch transmission of FIGS. 34 to 7 is comparable to the dual clutch transmission shown in FIG. 1, so that a detailed description is not required.

Figure 4:
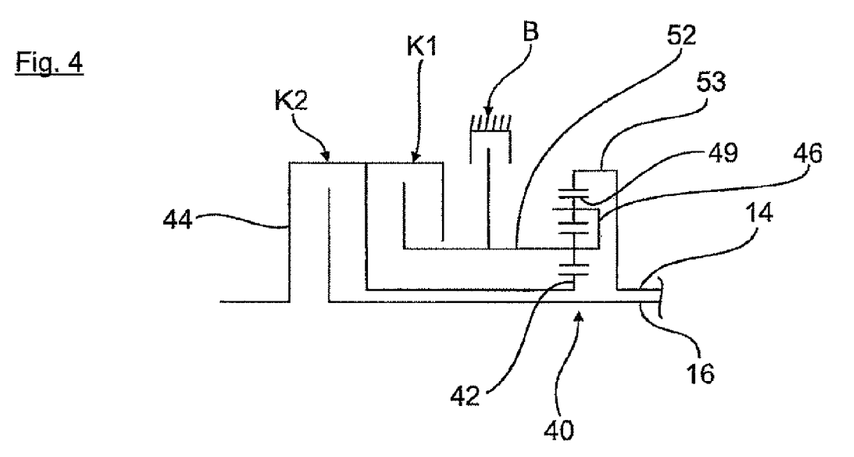
FIGS. 4 to 7 respectively partial views of further exemplary embodiments.

As in FIG. 1, in FIG. 4 a planetary transmission 40 is also arranged upstream of the input shaft 14 of the not shown subtransmission A. In FIG. 4 the input element of the planetary transmission 40 is also the sun gear 42, which is connected to the housing 44 of the dual clutch K1, K2 and thus constantly rotates. In contrast to FIG. 1 the planetary transmission 40 in FIG. 4 has a dual planetary gearwheel set of which the radially outer planet gears 49 are carried by the web 46. The web 46 in FIG. 4 is the transmission element. The output element in FIG. 4 is formed by the outer hollow shaft 51, which is connected to the input shaft 14 in rotative fixed relationship with the input shaft 14.

FIGS. 5 to 7 respectively show further variations of the dual clutch transmission of FIG. 1. Thus in FIG. 5 the clutch K1 is arranged downstream of the clutch K2 and the brake B in the force flux direction via a free space 51. Constructively advantageously, the spur gear 24 of the output stage 25 protrudes into the free space 51. In addition, the clutch K2 is arranged in the force flux direction upstream of the brake B.

In FIG. 6 the brake B is arranged downstream to the clutch K2 in the force flux direction. also in this case the spur gear 24 of the output stage protrudes into the free space 51. The brake B is arranged in force flux direction upstream of the clutch K1.

In FIG. 7 the clutch K2 is arranged in the force flux direction upstream to the brake B and the clutch K1 via the free space 51, in which the output stage 25 is arranged. The clutch K1 is arranged in the force flux direction upstream of the brake B.

Figure 8:
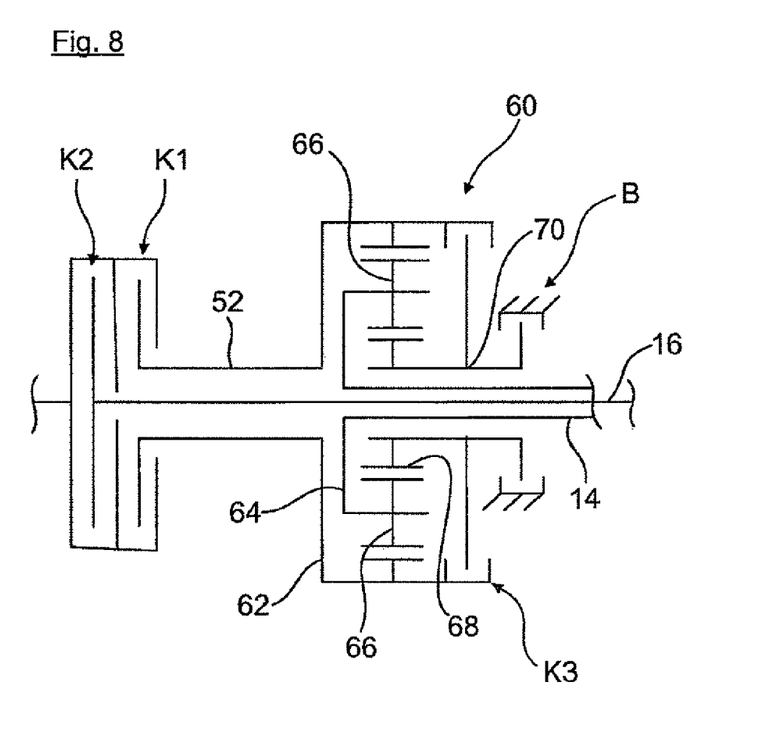
FIG. 8 a comparative example not according to the invention.

In FIG. 8 an alternative embodiment to that of FIG. 1 of the upstream arranged planetary transmission is shown, which however is not included in the invention; functionally same parts are provided with the same reference signs.

The planetary transmission 60, which is attached to the dual clutch K1, K2, has a ring gear 62 as input element, which is drivingly connected to the clutch K1 via the hollow shaft 52, a web 64 with rotatably supported planet gears 66 as output element and a sun gear 68 as transmission element.

The web 64 is directly drivingly connected with the input hollow shaft 14 of the subtransmission A, while the sun gear 68 is connected to the housing-fixed brake B via a further hollow shaft 70.

Further a separate multi-disc clutch K3 is arranged between the ring gear 62 and the hollow shaft 70 or the sun gear 68, which separate clutch under hydraulic action connects the ring gear 62 with the sun gear 68 and thus forms the 1:1 transmission ratio of the planetary transmission 60. The clutch K1 then drives the hollow shaft 14 of the subtransmission (A) via the blocked planetary transmission 60.

The planetary transmission can be shifted into the lower gears in that the clutch K3 is disengaged and the brake B is actuated. Then the engaged clutch K1 drives the input hollow shaft 14 via the ring gear 62, the planet gears 66 and the web 64, while the sun gear 68 as support element is braked fixed.

In contrast to the exemplary embodiments of FIGS. 1 to 7 the input element (here the outer ring gear 62) in FIG. 8 is not connected in rotative fixed relationship on the housing 44 of the dual clutch. For shifting between the transmission stages therefore not only the brake B has to be provided but in addition also the separate clutch K3. Correspondingly, in the construction with the separate clutch K3 shown in FIG. 8 an additional shifting element is required.

Figure 9:
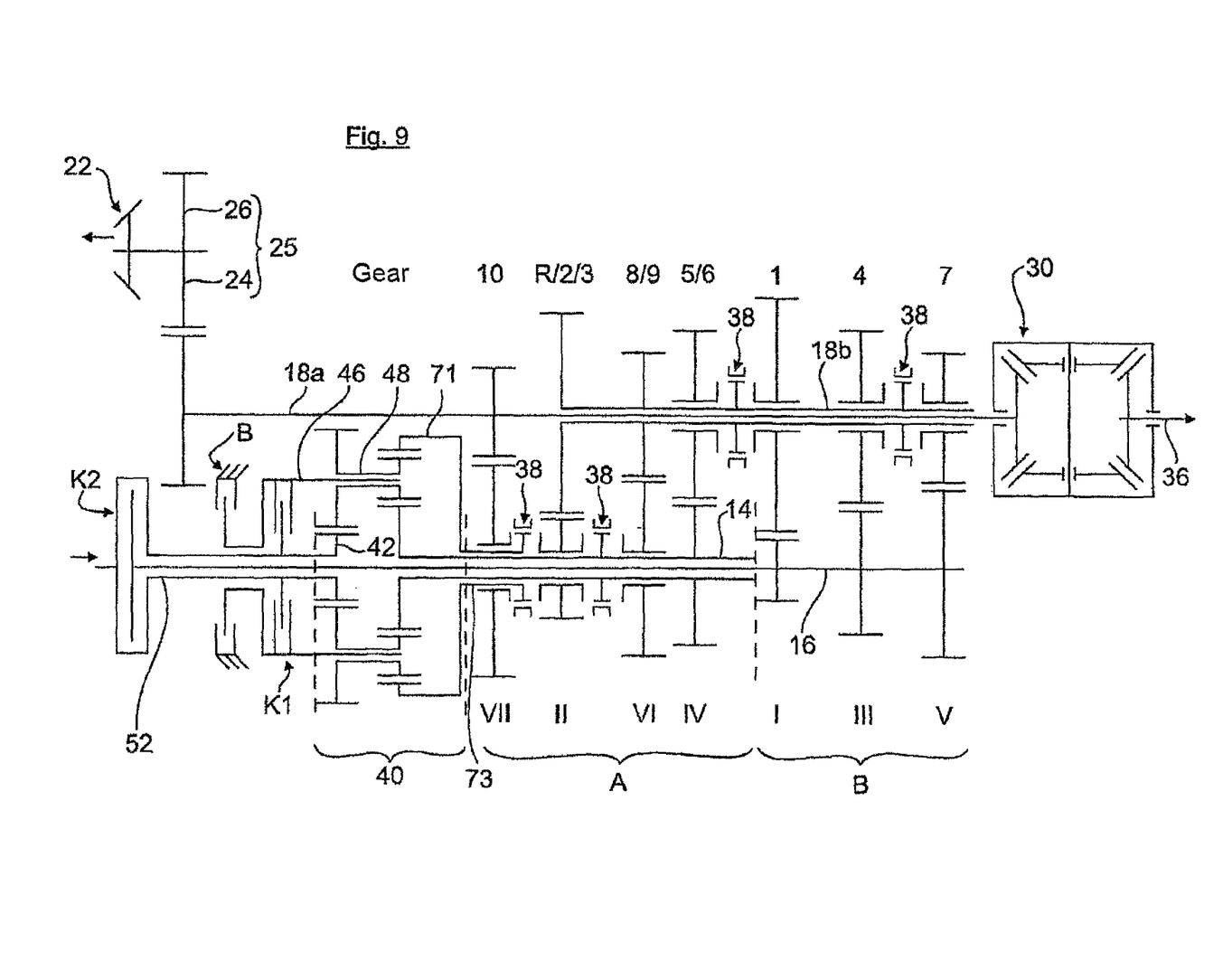
FIG. 9 a further dual clutch transmission with a total of ten forward gears and a reverse gear R and four shifting groups.

FIG. 9 shows a further dual clutch transmission which has a total of ten forward gears and a reverse gear R and for shifting groups 38. In the subtransmission A four forward gear gearwheel sets II, IV, VI and VII are arranged, which are formed in a known manner by fixed gears and idler gears. The idler gears can be shifted via synchronizing clutches 38. The gearwheel sets II, IV, VI, VII form the forward gears 2/3, 5/6, 8/9 and 10. In addition the gearwheel set II forms a reverse gear R, as will be explained below. In the subtransmission B the forward gear gearwheel sets I, II, V are provided. These are also formed by fixed gears and idler gears which can be shifted via synchronizing clutches 38 and form the forward gears 1, 4 and 7.

In FIG. 9 the subtransmissions A and B have a common synchronizing clutch 38. The common synchronizing clutch 38 is mounted on the output hollow shaft 18b and can be shifted with the gearwheel set I or with the gearwheel set IV.

The arrangement of the dual clutches K1 and K2 shown in FIG. 9 essentially corresponds to the arrangement shown in FIG. 5. In contrast to FIG. 5, the planetary transmission 40 in FIG. 9 further has an outer ring gear 71, which meshes with the smaller gearwheels of the multi-stage planet gears 48. The outer ring gear 71 is connected with an intermediate hollow shaft 73 which is supported coaxial to the input hollow shaft 14.

Via a synchronizing clutch 38, the intermediate hollow shaft 73 is connectable with the gearwheel set VII (for shifting the 10$^{th}$ forward gear) or with the gearwheel set II (for shifting the reverse gear R). In addition the gearwheel set II is connectable with the input hollow shaft 14 via a further synchronizing clutch 38.

For shifting the reverse gear R, the gearwheel set II is shifted via the synchronizing clutch 38 arranged on the intermediate hollow shaft 73. In addition the clutch K1 is disengaged and the brake B is actuated. The force flux is therefore conducted to the gearwheel set II via the clutch housing 44, the sun gear 42, the multi-stage planet gears 48 and the outer ring gear 73 associated with reversing the direction of rotation and at shifted synchronizing clutches 38.

For shifting the 10$^{th}$ forward gear the gearwheel set VII is shifted via the synchronizing clutch 38 arranged on the intermediate hollow shaft 73. In addition the brake B is disengaged and the clutch K1 is engaged. As a result the planetary transmission 40 is blocked, i.e., blocked in itself. The force flux is therefore conducted to the outer ring gear 71 via the clutch housing 44, the blocked planetary transmission 40 without reversal of the rotation direction and further to the shifted gearwheel set VII.

The invention claimed is:

1. A shifting device for a dual clutch transmission as a change-speed transmission for motor vehicles, comprising:
   two coaxially arranged input shafts which are respectively activatable via one of two clutches of a dual clutch;
   an output shaft;
   gearwheel sets arranged on the input shafts which are shiftable by means of synchronizing clutches for forming a plurality of forward gears and a reverse gear, said gearwheel sets being divided into a first subtransmission comprising one of the input shafts and a second subtransmission comprising the other one of the input shafts; and
   a planetary transmission, which is shiftable between at least two transmission stages and is arranged upstream of one of the first and second subtransmissions, and which has an input element, an output element and a transmission element, said input element being permanently drivingly connected with a housing of the dual clutch,
   wherein for shifting into a first one of the transmission stages the transmission element is fixable via a brake, and for shifting into a second one of the transmission stages the transmission element is connectable with the input element via one of the clutches,
   wherein the planetary transmission is shifted to a further 1:1 transmission stage when the dual clutch is engaged and the brake is disengaged, and
   wherein the change-speed transmission has eight forward gears, of which a first and a second forward gear, a fourth and a fifth forward gear, and a seventh and an eighth forward gear, are assigned to the first subtransmission with the upstream arranged planetary transmission and the third and sixth forward gear are assigned to the second subtransmission.

2. The shifting device of claim 1, wherein the planetary transmission is shifted between the two transmission stages.

3. The shifting device of claim 1, wherein the planetary transmission is shifted into a further lower or higher transmission stage relative to the first stage when the clutch is disengaged and the brake is engaged.

4. The shifting device of claim 1, wherein the input element is constructed as a first sun gear the output element, is constructed as a second sun gear, and transmission element is constructed as a web on which multi-stage planet gears are supported, which are in engagement with the first and second sun gears.

5. The shifting device of claim 1, wherein the planetary transmission is configured as a minus transmission, said minus transmission including intermeshing planet gears.

6. The shifting device of claim 5, wherein the planetary transmission has a transmission ratio of $i_0 = -3$.

7. The shifting device of claim 5, wherein the input element is a first sun gear in continuous driving relation via the housing of the dual clutch, wherein the output element is constructed as a web having multi-stage first planet gears in engagement with the first sun gear and second planet gears supported on the web, said transmission element constructed as a second sun gear meshing with the second planet gears.

8. The shifting device of claim 7, wherein the second sun gear is drivable via the clutch for forming a 1:1 transmission ratio, or is blockable via the brake for shifting to a lower/higher transmission ratio.

9. The shifting device of claim 1, wherein the change speed-transmission has more than eight forward gears, wherein a ninth gear is assigned to the second subtransmission via a further gearwheel set and forward gears 10 and 11 are assigned to the first subtransmission via the further gearwheel set.

10. The shifting device of claim 1, wherein one of the gearwheel sets has an intermediate gearwheel and is assigned to the first subtransmission for forming two reverse gears.

11. The shifting device of claim 10, wherein one of the gearwheel sets with the intermediate gearwheel is arranged in the second subtransmission to form the reverse gear.

12. The shifting device of claim 1, wherein the one of the clutches of the dual clutch is arranged in a force flux direction downstream of the other one of the clutches of the dual clutch and the brake.

13. The shifting device of claim 1, wherein a drive component, of an output stage protrudes into a free space.

14. The shifting device of claim 13, wherein the drive component is a spur gear.

15. The shifting device of claim 1, wherein the brake is arranged in a force flux direction downstream of the other one of the clutches of the dual clutch.

16. The shifting device of claim 1, wherein the brake is arranged in a force flux direction upstream of the one of the clutches of the dual clutch.

17. The shifting device of claim 1, wherein the other one of the clutches of the dual clutch is arranged in a force flux direction upstream of the brake and the one of the clutches of the dual clutch.

18. The shifting device of claim 17, wherein the one of the clutches of the dual clutch is arranged in a force flux direction upstream of the brake.

19. The shifting device of claim 1, wherein the planetary transmission comprises an outer ring gear, and an intermediate hollow shaft which is coaxially arranged on the input shaft, with one of the synchronizing clutches being arranged on the intermediate hollow shaft, said intermediate hollow shaft being connectable via the one of the synchronizing clutches with one of a forward gear gearwheel set, wherein the forward gear gearwheel set is connectable via the one of the synchronizing clutches for shifting of the reverse gear, as the clutch is disengaged and the brake is engaged.

20. The shifting device of claim 1, wherein a further forward gear gearwheel set is shiftable via the synchronizing clutch arranged on the intermediate hollow shaft when the clutch is engaged and the brake is disengaged.

* * * * *